US009753902B2

United States Patent
Dalal et al.

(10) Patent No.: US 9,753,902 B2
(45) Date of Patent: Sep. 5, 2017

(54) SYSTEM AND METHOD FOR ORCHESTRATION OF CUSTOMIZATION FOR A USER EXPERIENCE

(71) Applicant: eBay Inc., San Jose, CA (US)

(72) Inventors: Vipul C. Dalal, Sunnyvale, CA (US); Rangaraj Keshavamurthy Belur, San Jose, CA (US)

(73) Assignee: eBay Inc., San Jose, CA (US)

( * ) Notice: Subject to any disclaimer, the term of this patent is extended or adjusted under 35 U.S.C. 154(b) by 424 days.

(21) Appl. No.: 14/503,354

(22) Filed: Sep. 30, 2014

(65) Prior Publication Data

US 2015/0019954 A1 Jan. 15, 2015

Related U.S. Application Data

(63) Continuation of application No. 12/315,687, filed on Dec. 5, 2008, now Pat. No. 8,904,345.

(Continued)

(51) Int. Cl.
G06F 9/44 (2006.01)
G06F 17/22 (2006.01)
(Continued)

(52) U.S. Cl.
CPC ........ *G06F 17/2247* (2013.01); *G06F 3/0482* (2013.01); *G06F 17/30867* (2013.01);
(Continued)

(58) Field of Classification Search
None
See application file for complete search history.

(56) References Cited

U.S. PATENT DOCUMENTS 5,991,735 A 11/1999 Gerace
6,564,170 B2 5/2003 Halabieh
(Continued)

FOREIGN PATENT DOCUMENTS

WO WO-2009142768 A1 11/2009

OTHER PUBLICATIONS

U.S. Appl. No. 13/746,184, Final Office Action mailed Jan. 25, 2016, 11 pgs.
(Continued)

*Primary Examiner* — Chuck Kendall
(74) *Attorney, Agent, or Firm* — Schwegman Lundberg & Woessner, P.A.

(57) ABSTRACT

A system and method for orchestration of customization for a user experience is disclosed. The system in an example embodiment includes automatically producing user experience customization selections for generating a webpage based on context information and a collection of user activity feedback from a community of users who previously interacted with the webpage. The user experience customization selections include a plurality of modules for inclusion in the web page, where each of the modules represent a user-interface element. One or more of the plurality of modules having input and output properties defining at least one application programming interface (API). The system in a further embodiment includes discovering dependencies between the one or more of the plurality of modules by extracting dependency information from the at least one API associated with the one or more of the plurality of modules. The system in another embodiment includes generating a dependency graph for the webpage based on the dependencies between the one or more of the plurality of modules and invoking the plurality of modules based on the dependency graph to generate the webpage.

20 Claims, 10 Drawing Sheets

Related U.S. Application Data

(60) Provisional application No. 61/101,587, filed on Sep. 30, 2008.

(51) Int. Cl.
*G06F 3/0482* (2013.01)
*G06F 17/30* (2006.01)
*H04W 4/02* (2009.01)
*G06F 3/048* (2013.01)

(52) U.S. Cl.
CPC .............. *G06F 3/048* (2013.01); *G06F 17/30* (2013.01); *H04W 4/025* (2013.01)

(56) References Cited

U.S. PATENT DOCUMENTS

| | | | |
|---|---|---|---|
| 6,631,184 B1 | 10/2003 | Weiner | |
| 6,842,877 B2 | 1/2005 | Robarts et al. | |
| 6,981,040 B1 | 12/2005 | Konig et al. | |
| 7,072,888 B1 | 7/2006 | Perkins | |
| 7,171,629 B2 | 1/2007 | Quimby et al. | |
| 7,263,663 B2 | 8/2007 | Ballard et al. | |
| 7,801,885 B1 | 9/2010 | Verma et al. | |
| 7,979,457 B1 | 7/2011 | Garman | |
| 8,099,178 B2 | 1/2012 | Mairs et al. | |
| 8,359,237 B2 | 1/2013 | Dalal et al. | |
| 8,904,345 B2 | 12/2014 | Dalal et al. | |
| 2002/0010753 A1 | 1/2002 | Matsuoka et al. | |
| 2002/0099605 A1 | 7/2002 | Weitzman et al. | |
| 2002/0138562 A1 | 9/2002 | Wies et al. | |
| 2002/0152244 A1* | 10/2002 | Dean ................... | G06F 17/2247 715/255 |
| 2004/0019688 A1 | 1/2004 | Nickerson et al. | |
| 2004/0066401 A1 | 4/2004 | Bushey et al. | |
| 2004/0169678 A1 | 9/2004 | Oliver | |
| 2004/0199584 A1 | 10/2004 | Kirshenbaum et al. | |
| 2005/0108001 A1 | 5/2005 | Aarskog | |
| 2006/0075019 A1 | 4/2006 | Donovan et al. | |
| 2006/0155689 A1 | 7/2006 | Blakeley et al. | |
| 2006/0200749 A1 | 9/2006 | Shenfield | |
| 2007/0055757 A1 | 3/2007 | Mairs et al. | |
| 2007/0078828 A1 | 4/2007 | Parikh et al. | |
| 2007/0100797 A1 | 5/2007 | Thun et al. | |
| 2007/0100821 A1 | 5/2007 | Freeman et al. | |
| 2007/0100867 A1 | 5/2007 | Celik et al. | |
| 2007/0174390 A1 | 7/2007 | Silvain et al. | |
| 2007/0180386 A1 | 8/2007 | Ballard et al. | |
| 2007/0208724 A1 | 9/2007 | Madhavan et al. | |
| 2007/0244914 A1 | 10/2007 | Kreiner | |
| 2007/0276803 A1 | 11/2007 | Shakib et al. | |
| 2008/0005161 A1 | 1/2008 | Grealish et al. | |
| 2008/0021918 A1 | 1/2008 | Rao | |
| 2008/0033790 A1 | 2/2008 | Nickerson et al. | |
| 2008/0059455 A1 | 3/2008 | Canoy et al. | |
| 2008/0071929 A1 | 3/2008 | Motte et al. | |
| 2008/0092060 A1 | 4/2008 | Berg et al. | |
| 2008/0147710 A1 | 6/2008 | Naam et al. | |
| 2008/0172326 A1 | 7/2008 | Winters | |
| 2008/0235608 A1 | 9/2008 | Prabhu | |
| 2008/0275902 A1 | 11/2008 | Burges et al. | |
| 2008/0301093 A1 | 12/2008 | Haugen et al. | |
| 2009/0019053 A1 | 1/2009 | Burgess et al. | |
| 2009/0031015 A1 | 1/2009 | Morgan et al. | |
| 2009/0055384 A1 | 2/2009 | Jain et al. | |
| 2009/0063500 A1 | 3/2009 | Zhai et al. | |
| 2009/0164408 A1 | 6/2009 | Grigorik et al. | |
| 2009/0164929 A1 | 6/2009 | Chen et al. | |
| 2009/0216760 A1 | 8/2009 | Bennett | |
| 2009/0292584 A1 | 11/2009 | Dalal et al. | |
| 2010/0083217 A1 | 4/2010 | Dalal et al. | |
| 2012/0023081 A1 | 1/2012 | Nayak et al. | |
| 2012/0226995 A1 | 9/2012 | Kimchi et al. | |
| 2013/0132824 A1 | 5/2013 | Dalal et al. | |
| 2014/0108968 A1 | 4/2014 | Vishria | |

OTHER PUBLICATIONS

U.S. Appl. No. 13/746,184, Final Office Action mailed Feb. 10, 2015, 13 pgs.
U.S. Appl. No. 13/746,184, Non Final Office Action mailed Jun. 19, 2015, 13 pgs.
U.S. Appl. No. 13/746,184, Response filed May 11, 2015 to Final Office Action mailed Feb. 10, 2015, 19 pgs.
U.S. Appl. No. 13/746,184, Response filed Oct. 19, 2015 to Non Final Office Action mailed Jun. 19, 2015, 17 pgs.
U.S. Appl. No. 12/126,709, Final Office Action mailed Mar. 15, 2012, 17 pgs.
U.S. Appl. No. 12/126,709, Non Final Office Action mailed Aug. 19, 2011, 17 pgs.
U.S. Appl. No. 12/126,709, Notice of Allowance mailed Sep. 17, 2012, 9 pgs.
U.S. Appl. No. 12/126,709, Response filed Jul. 11, 2012 to Final Office Action mailed Mar. 15, 2012, 11 pgs.
U.S. Appl. No. 12/126,709, Response filed Dec. 19, 2011 to Non-Final Office Action mailed Aug. 19, 2011, 10 pgs.
U.S. Appl. No. 12/315,687, Final Office Action mailed Jul. 12, 2012, 13 pgs.
U.S. Appl. No. 12/315,687, Final Office Action mailed Jul. 19, 2013, 14 pgs.
U.S. Appl. No. 12/315,687, Non Final Office Action mailed Feb. 4, 2013, 14 pgs.
U.S. Appl. No. 12/315,687, Non Final Office Action mailed Nov. 10, 2011, 16 pgs.
U.S. Appl. No. 12/315,687, Non Final Office Action mailed Dec. 20, 2013, 18 pgs.
U.S. Appl. No. 12/315,687, Notice of Allowance mailed Aug. 1, 2014, 11 pgs.
U.S. Appl. No. 12/315,687, Response filed Mar. 12, 2012 to Non Final Office Action mailed Nov. 10, 2011, 10 pgs.
U.S. Appl. No. 12/315,687, Response filed Mar. 20, 2014 to Non Final Office Action mailed Dec. 30, 2013, 11 pgs.
U.S. Appl. No. 12/315,687, Response filed May 6, 2013 to Non Final Office Action mailed Feb. 4, 2013, 11 pgs.
U.S. Appl. No. 12/315,687, Response filed Oct. 21, 2013 to Final Office Action mailed Jul. 19, 2013, 9 pgs.
U.S. Appl. No. 12/315,687, Response filed Nov. 12, 2012 to Final Office Action mailed Jul. 12, 2012, 9 pgs.
U.S. Appl. No. 13/746,184 , Response filed Feb. 3, 2014 to Non Final Office Action mailed Oct. 2, 2013, 10 pgs.
U.S. Appl. No. 13/746,184, Final Office Action mailed Mar. 4, 2014, 10 pgs.
U.S. Appl. No. 13/746,184, Non Final Office Action mailed Aug. 13, 2014, 13 pgs.
U.S. Appl. No. 13/746,184, Non Final Office Action mailed Oct. 2, 2013, 10 pgs.
U.S. Appl. No. 13/746,184, Preliminary Amendment filed Apr. 10, 2013, 10 pgs.
U.S. Appl. No. 13/746,184, Response filed Jun. 4, 2014 to Final Office Action mailed Mar. 4, 2014, 9 pgs.
U.S. Appl. No. 13/746,184, Response filed Nov. 12, 2014 to Non Final Office Action mailed Aug. 13, 2014, 11 pgs.
International Application Serial No. PCT/US2009/003187, International Preliminary Report on Patentability mailed Dec. 2, 2010, 6 pgs.
International Application Serial No. PCT/US2009/003187, Search Report mailed Jul. 29, 2009, 4 pgs.
International Application Serial No. PCT/US2009/003187, Written Opinion mailed Jul. 29, 2009, 5 pgs.

\* cited by examiner

SYSTEM AND METHOD FOR ORCHESTRATION OF CUSTOMIZATION FOR A USER EXPERIENCE

RELATED APPLICATIONS

This patent application is a continuation of U.S. patent application Ser. No. 12/315,687, filed on Dec. 5, 2008, which claims the benefit of priority to U.S. Provisional Patent Application Ser. No. 61/101,587, filed on Sep. 30, 2008, the benefit of each of which is claimed hereby, and each are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc., All Rights Reserved.

BACKGROUND

Technical Field

This disclosure relates to methods and systems supporting computing and data processing systems. More particularly, a system and method for orchestration of customization for a user experience is described.

Related Art

Conventional systems, like Amazon.com, can use a buyer's previously purchased product or product category/genre to suggest new products in a same or similar category/genre for the user. However, these prior systems are typically one-dimensional. That is, one-dimensional input (e.g. product category/genre) leads to one-dimensional output (e.g. new products in a same or similar category/genre). These conventional systems cannot provide multi-dimensional context analysis to provide a multi-dimensional output based on (customized from) a collection of activity from a community of users gathered over time.

U.S. Pat. No. 6,981,040 describes a method for providing automatic, personalized information services to a computer user including the following steps: transparently monitoring user interactions with data during normal use of the computer; updating user-specific data files including a set of user-related documents; estimating parameters of a learning machine that define a User Model specific to the user, using the user-specific data files; analyzing a document to identify its properties; estimating the probability that the user is interested in the document by applying the document properties to the parameters of the User Model; and providing personalized services based on the estimated probability. Personalized services include personalized searches that return only documents of interest to the user, personalized crawling for maintaining an index of documents of interest to the user; and personalized navigation that recommends interesting documents that are hyperlinked to documents currently being viewed.

U.S. patent application Ser. No. 11/264,366 describes a method for providing advertising content for display in a page over a network. A plurality of advertisements are determined that are qualified for display at a location in the page. When an advertiser has stores located at a plurality of geographic sites, only one advertisement for a store located at a first geographic site may be displayed. Thereafter, the advertisement for a store located at a second geographic site different from the first geographic site may be displayed.

U.S. patent application Ser. No. 11/370,258 describes a system and method to facilitate expansion, disambiguation, and optimization of search queries over a network wherein an original query received from a user is parsed to obtain at least one query term. A plurality of keywords related contextually to one or more query terms are further retrieved from a database. Finally, a set of modified queries is generated, each modified query further comprising at least one query term and at least one retrieved keyword.

Thus, a system and method for orchestration of customization for a user experience are needed.

BRIEF DESCRIPTION OF THE DRAWINGS

Embodiments illustrated by way of example and not limitation in the figures of the accompanying drawings, in which.

DETAILED DESCRIPTION

Figure 1:
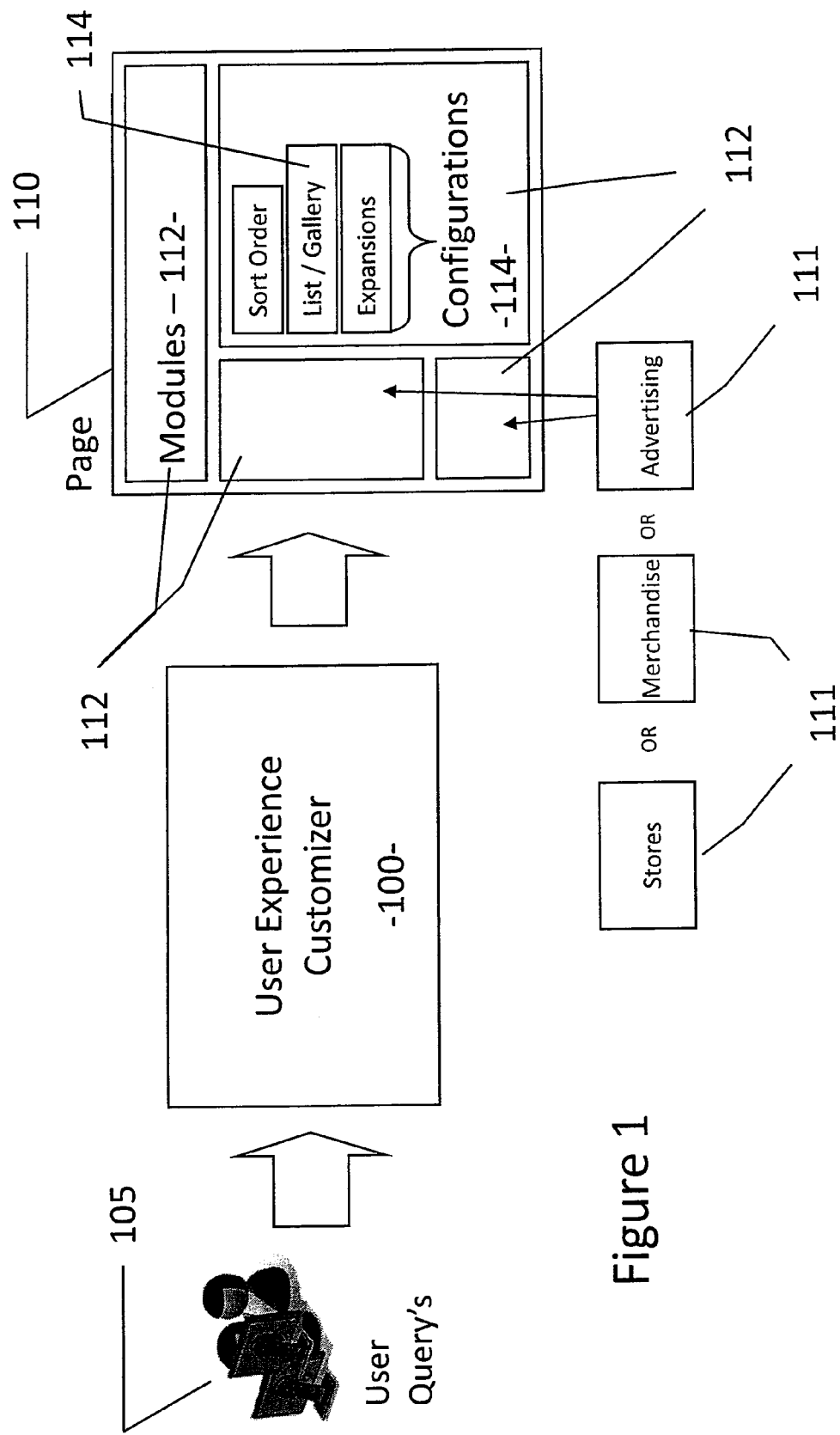
FIG. 1 illustrates an example of a particular embodiment of the automated, community-driven, self-learning system.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a system and method for orchestration of customization for a user experience. The user experience includes a computer-implemented user interface and functionality supporting the processing capabilities provided for a computer user. Various embodiments are described below in connection with the figures provided herein.

In an example embodiment, an automated, community-driven, self-learning system uses collected user activity feedback to customize the serving of web page content to users in a context-sensitive manner. The system uses context input, including the user's search query/keywords, a related product or service category, a user/segment profile, site identifier (ID), domain, etc., and user activity feedback to perform the following customization operations:

1. choose among a variety of page types given the context input. The page types can include any type of webpage, window, frame, dialog box, user interface screen, textual or image display, or the like. Particular examples of such page types include, an all matching items (AMI) type, a dynamic landing page (DLP) type, a registration page, etc. It will be apparent to those of ordinary skill in the art the other page types can be similarly defined;
2. on the selected page type, populate a likely relevant set of widgets/modules (e.g. advertisements, links, selection lists, information blocks, etc.) for display on the page given the context input; and
3. for one or more widgets/modules, seta configuration for the widgets/modules (e.g. a sorting of the data) given the context input.

In various embodiments described herein, the automated, community-driven, self-learning system uses multi-dimensional input (context input) to produce multi-dimensional output (selections of page type, widget set, and/or configuration) all based on (customized from) a collection of activity feedback gathered from a community of users gathered over time. As described herein, a widget (or module) is an interface element with which a computer user interacts, such as a window, frame, or a text box. The defining characteristic of a widget is to provide a single interaction point for the direct manipulation of a given kind of data. Widgets are visual basic building blocks which, when combined in an application, hold all the data processed by the application and the available interactions on this data.

In general, various embodiments use context input, including user and query information and user activity feedback to automatically generate and display the most relevant or most likely user-favored next page for that context using a predictive model. User information can include explicitly or implicitly obtained demographic information, explicitly or implicitly obtained user profile information, user transaction history, user activity history, and/or any other information explicitly or implicitly Obtained that may indicate user preferences. Additionally, a perturbation engine is used to include, for some users, a slightly sub-optimal selection of page type, widget set, and/or configuration to cause the system to re-affirm the optimal selections and to introduce new selections that may have otherwise not been considered or selected. The perturbation engine enables a particular user or set of users to be exposed to a selection of page type, widget set, and/or configuration to which the user/users may not have otherwise been exposed. In some cases, a particular user or set of users can be exposed to a sub-optimal or under-performing selection of page type, widget set, and/or configuration.

FIG. 1 illustrates an example of a particular embodiment of the automated, community-driven, self-learning system. In a community of users 105, networked computer users can use various servers (e.g. websites available via a public network such as the Internet) and search engines to perform various operations, such as searching for items using search queries and a search engine, performing e-commerce transactions, shopping or bidding on goods or services, browsing for information or items of interest, and the like. Typically, these user operations include some form of user input (e.g. a search query or set of keywords entered as text in an input field of a search engine). This user input provides one form of context input used by user experience customizer 100 to automatically customize the user experience for the user community. Other forms of context input collected and/or used by the user experience customizer 100 can include: a related product or service category, a user/segment profile or other user information, site identifier (ID), domain, etc. The related product or service category can include category(s) of products or services that relate to the searches or e-commerce transactions a user may have currently or previously submitted. A user/segment profile or other user information represents a user profile explicitly entered by a user or implicitly generated based on past user activity or behavior. The user profile can specify various demographic information, configurations, defaults, preferences, and the like associated with a particular user or group of users. User information can include explicitly or implicitly obtained demographic information, explicitly or implicitly Obtained user profile or preference information, user transaction history, user activity history, and/or any other information explicitly or implicitly obtained that may indicate user preferences. The site identifier (ID) or domain name can specify a particular network location or geographic location associated with a user or group of users. It will be apparent to those of ordinary skill in the art that other information can be retrieved as context information or input associated with a particular point in time.

As shown in FIG. 1, this context input can be provided to user experience customizer 100. As will be described in more detail below, user experience customizer 100 includes predictive data and associated computer-implemented rules that can be applied to the context input to produce decisions or selections related to the type of user experience to present to the user that will represent the most relevant or most likely favored user experience for the user based on the context input. As a result, in a particular embodiment, a user experience, including user interface and available functionality in the form of a webpage 110 can be generated by user experience customizer 100. This webpage 110 can include a particular page type selected by the user experience customizer 100 from a plurality of available page types described above (e.g., AMI—all matching items, DLP—dynamic landing page, VIP—view item page, etc.). The page type can define the structure and/or arrangement of information and images provided on the webpage. Based on the selected page type, a plurality of modules or widgets 112 can be placed in the available locations of the selected page type. The particular modules placed in page 110 are selected by the user experience customizer 100 from a plurality of available page modules or widgets (e.g. list, graphic, data input, etc.). Once the selected modules 112 are placed in the page 110, the information content for each of the modules 112 is selected by the user experience customizer 100 from a plurality of available information content sources 111 (e.g. store locations, merchandise listings, advertising items, etc.). Once the content from the selected content sources are placed in the corresponding selected modules 112, the predictive model can further configure the information content displayed in modules 112 based on the context input. The particular configuration of information content displayed in modules 112 of page 110 is selected by the user experience customizer 100 from a plurality of available information content configurations (e.g. sort order, list or gallery display, expansion display, etc.).

Figure 2:
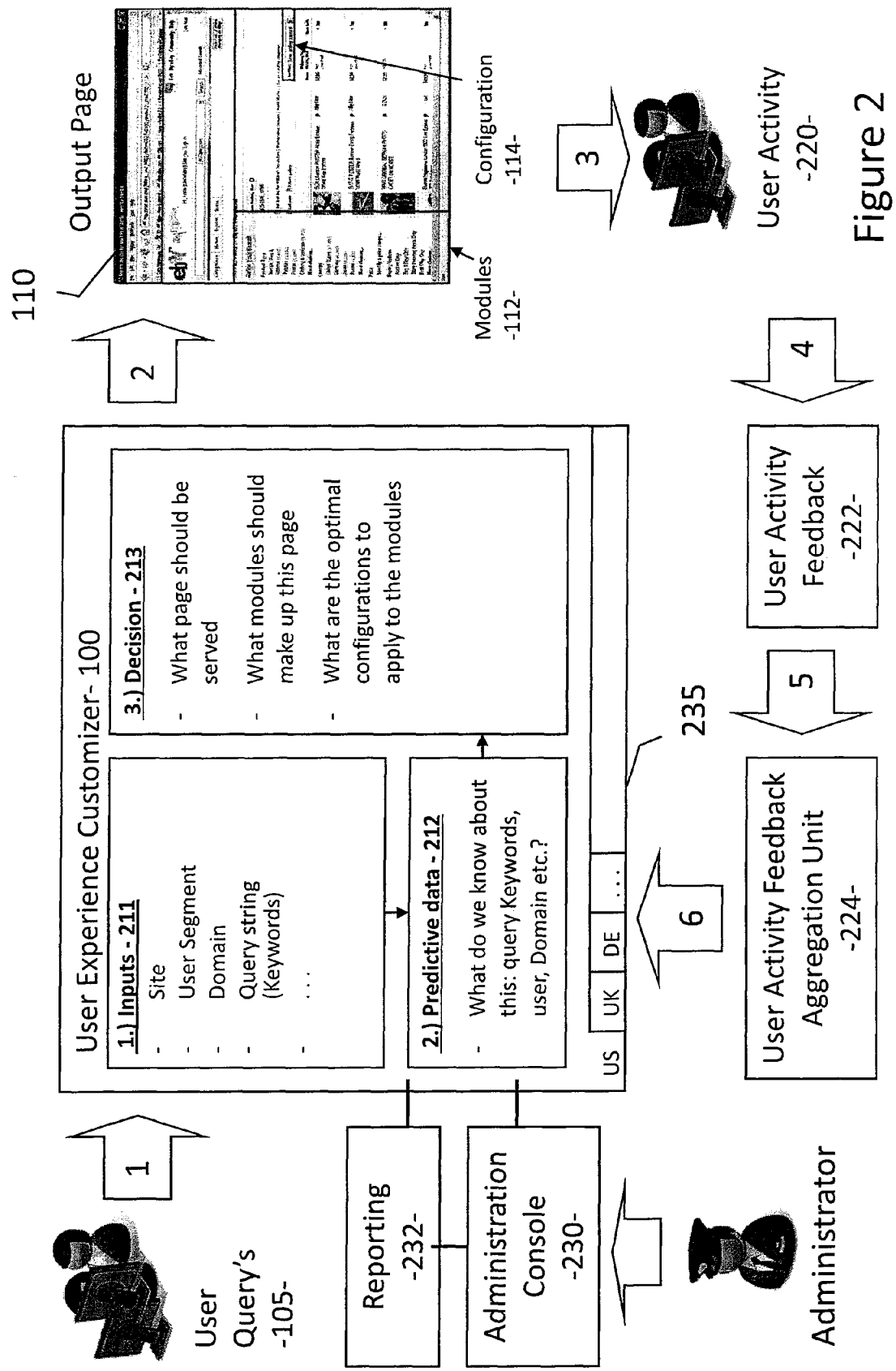
FIG. 2 illustrates the user experience customizer of a particular embodiment.

Referring now to FIG. 2, a more detailed system view of a particular embodiment is shown. As described above, context input 105 is provided to user experience customizer 100. The user experience customizer 100 of a particular embodiment is shown to include an input unit 211 to receive the context input 105 from the various sources described above. Once the context input is collected, aggregated, filtered, and structured by input unit 211, the processed context input is provided to predictive data unit 212. Predictive data unit 212 can take the processed context data and form correlations between the context data and the likely desirable structure and content provided in a corresponding user experience. These correlations can be resolved into decisions or selections made by the decision unit 213 based on the correlations made by the predictive data unit 212. The selections made by decision unit 213 include a selection of page type for the output page 110, a selection of modules 112 for the selected output page type 110, and a selection of configuration of content 114 displayed in the selected modules 112 of output page 110.

Once the user experience customizer 100 produces and displays the output page 110, the system of a particular embodiment shown in FIG. 2 can collect user activity feedback from a community of users 220 who interact with the output page 110. In the community of users 220, networked computer users can use various servers (e.g. websites available via a public network such as the Internet) to perform various operations on user interfaces (e.g. web pages, including output page 110), such as searching for items using search queries and a search engine, performing e-commerce transactions, shopping or bidding on goods or services, browsing for information or items of interest, and the like. These user-performed operations include various activities performed by the users, such as using a pointing device (e.g. computer mouse) to select, click, or mouseover various options, items, or links on a webpage, enter a search query or set of keywords, update a user profile, enter text into a user interface provided data entry field, browsing, shopping, bidding, or buying on-line, providing explicit feedback on a user experience, and other types of well-known user interactions with a computer-implemented user interface. These user activities can be recorded and saved in combination with information indicative of the structure and content of the webpage or user interface (e.g. page 110) with which the user was interacting at the time the user activity was recorded. This retained user activity feedback can be used to correlate the user's actions with the user interface acted upon. In this manner, user relevance or user desires is inferred from the user activity feedback. The use of this user activity feedback wilt be described in more detail below in connection with a particular embodiment.

As shown in FIG. 2, the user activity feedback 222 is collected from the user community 220 by a user activity feedback aggregation unit 224. The user activity feedback aggregation unit 224 produces structured and processed user activity feedback that can be used by the user experience customizer 100 to adjust the predictive data unit 212. For example, the rules implemented in predictive data unit 212 can be biased or weighted to produce selections that are more likely favored by the user community based on the user activity feedback 222.

As also shown in FIG. 2, user experience customizer 100 can also include a separate customizer for each of a plurality of region/sites as provided in tabs 235. Regions can include, for example, countries, states, geographical regions, and the like. Sites can include areas served by one or more computing sites, hubs, servers or server farms, and the like. Given a region/sites tab selection, the user experience customizer 100 can be configured to produce a different set of customized user interface pages 110 and different associated functionality that are specifically customized for a selected region/site and based on user activity feedback that is relevant for that selected region/site.

FIG. 2 also illustrates that the system of a particular embodiment can include an administrator access/control level that is accessed via an administration console 230. The administrator can cause the generation and display of various reports 232 that highlight the internal operation of the user experience customizer 100. The administration console 230 provides a view into how the user experience customizer 100 has made decisions over time. For example, the administration console 230 provides a view into how a decision was made to promote/demote a particular page type, module type, or configuration for a particular set of context input.

Figure 3:
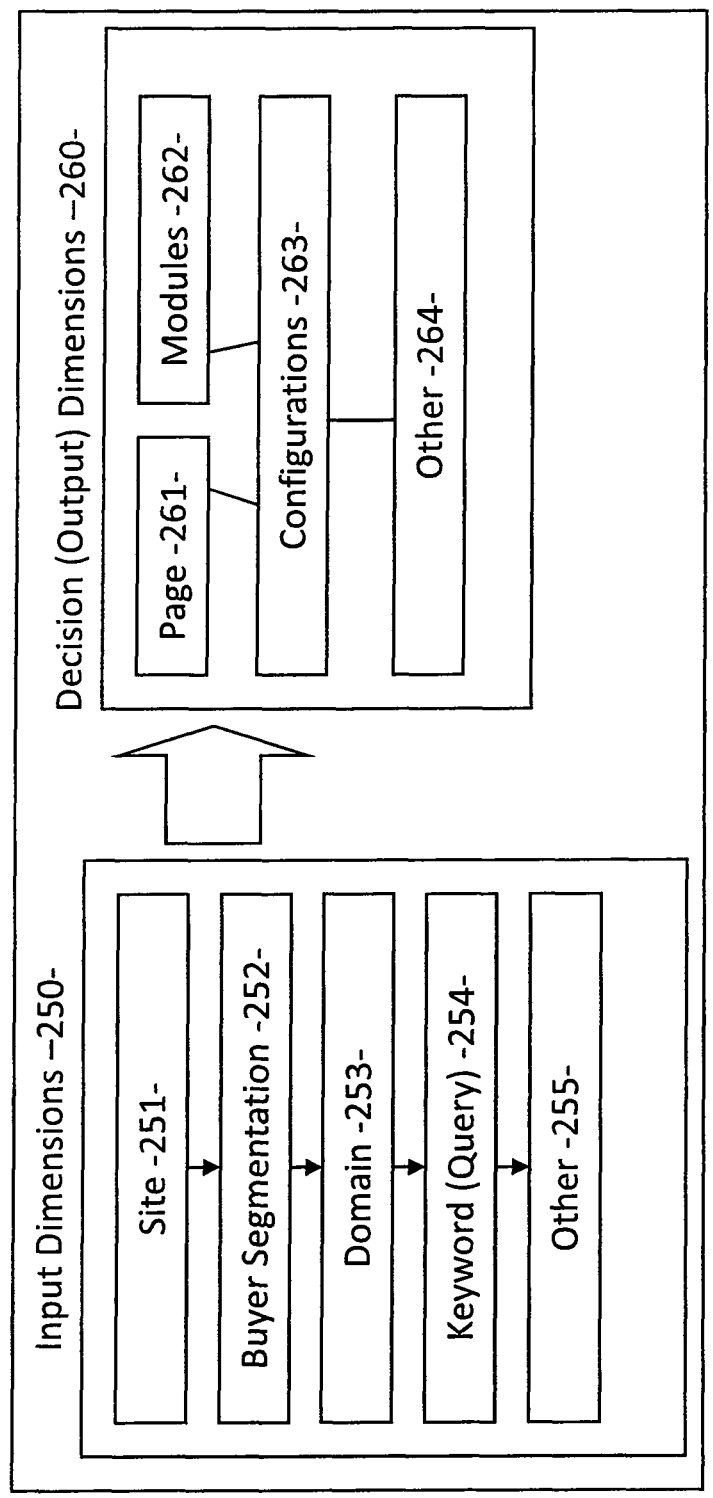
FIG. 3 illustrates the multiple input dimensions and multiple output dimensions of a particular embodiment.

Referring now to FIG. 3, the multiple input dimensions and multiple output dimensions of a particular embodiment are shown. The context input provided to user experience customizer 100 can include multiple dimensions including, for example, site 251, buyer segmentation 252, domain 253, keywords or search query 254, and other context related data 255. Site 25 information can include a user/buyer name, location, community code, IP address, user profile, and the like. Buyer segmentation 252 can include information that classifies the user/buyer into one or more purchaser/bidder/shopper groups based on pre-determined criteria. Domain 253 can include information identifying the server, website, merchant, or location, which the user/buyer has accessed. Keywords or search query 254 represents the user query 105 entered by a user. The items or dimensions included in the context information can be dynamically prioritized, re-ordered, and/or re-grouped so the user experience customizer 100 can receive the best context input available in a given situation. For example, if a particular item or dimension included in the context information does not provide sufficient or accurate information related to the particular dimension, the insufficient or inaccurate dimension can be re-ordered to a less valued position in the group of context information or the dimension can be eliminated from the context information altogether. In this manner, items or dimensions included in the context information can be ordered or grouped to fall back progressively to other sufficient and accurate dimensions in the group if a particular dimension does not provide sufficient or accurate information for the user experience customizer 100.

The output produced by the user experience customizer 100 can include multi-dimensional output, such as selections of page type 261, module/widget set 262, configuration 263, and/or other selections 264) all based on (customized from) a collection of user activity feedback from a community of users gathered over time. In general, various embodiments use context input, including user and query information and user activity feedback to automatically generate and display the most relevant next page for that context using a predictive model.

Figure 4:
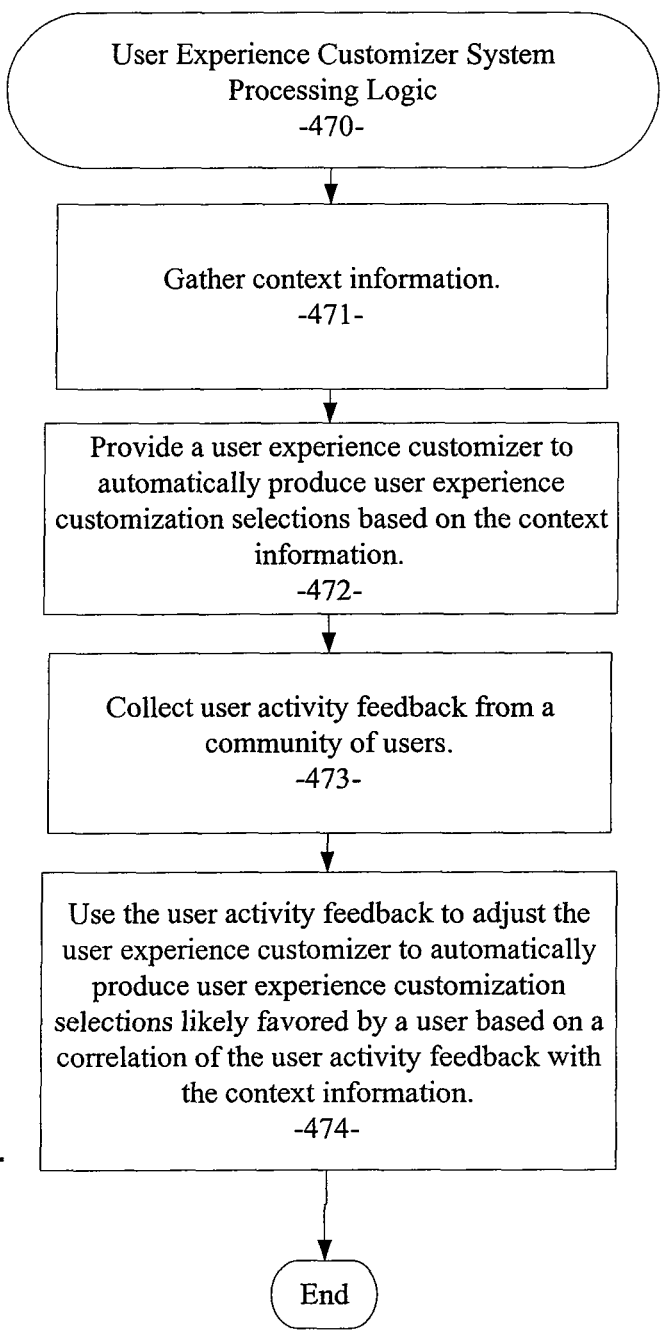
FIG. 4 illustrates a processing flow diagram for an example embodiment.

FIG. 4 illustrates a processing flow diagram for an example embodiment. In the embodiment shown, the system gathers context information (processing block 471); provides a user experience customizer to automatically produce user experience customization selections based on the context information (processing block 472); collects user activity feedback from a community of users (processing block 473); and uses the user activity feedback to adjust the user experience customizer to automatically produce user experience customization selections likely favored by a user based on a correlation of the user activity feedback with the context information (processing block 474).

Orchestration

Figure 6:
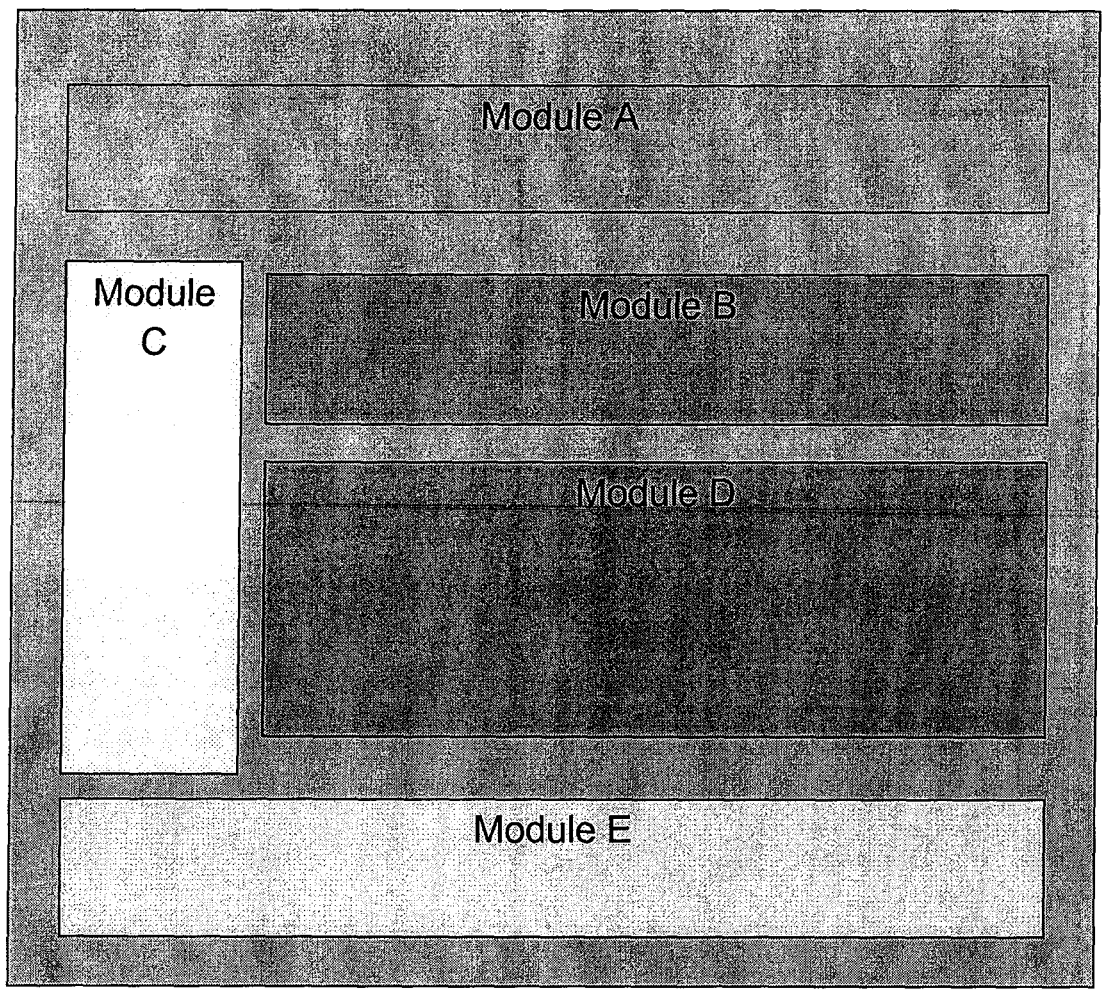
FIG. 6 illustrates an example webpage with component modules as shown by example.

In some cases, a dynamically-built webpage can create problems when portions of the webpage have interdependencies. We need the ability to invoke modules in a generic manner on a webpage that is built dynamically. As described herein, a module may represent a logical unit of code that can be reused on a web page or on multiple web pages. An example webpage with component modules is shown by example in FIG. 6.

We propose a solution herein that allows for modules to be executed generically on a web page. An orchestrator, as described in more detail below in connection with an example embodiment, reads the configuration for a page and dynamically determines which modules to invoke, how to invoke the modules, and in what order to invoke them. The orchestrator also manages dependencies between these modules on the webpage. This is achieved by building a Directed Asynchronous Graph of the modules to be invoked for a particular page. This process is described in more detail below.

In an ideal world, all the modules on a web page would be completely independent of each other and therefore the order of execution of these modules would not be relevant or problematic. In reality, however, we do encounter dependencies between modules; therefore, we need to provide a mechanism to invoke modules that have inter-dependencies among them. The dependencies between modules can be simple such as the one shown in FIG. 7, where there are no cyclic dependencies. In this scenario the order of execution is Module A, Module B and then Module C. Each module defines input and output properties. These input and output properties for the module define the application programming interface (API) for the module. These properties are also used to extract the dependency information. For example:

Module A has the following properties defined:
  <Property id="1" name="Property1" type="Input"/>
  <Property id="2" name="Property2" type="Output"/>
Module B has the following properties defined:
  <Property id="2" name="Property2" type="Input"/>
  <Property id="3" name="Property3" type="Output"/>

This example implies that Module B has a dependency on Module A; because, the Input Property for Module B is an output property for Module A.

Figure 7:
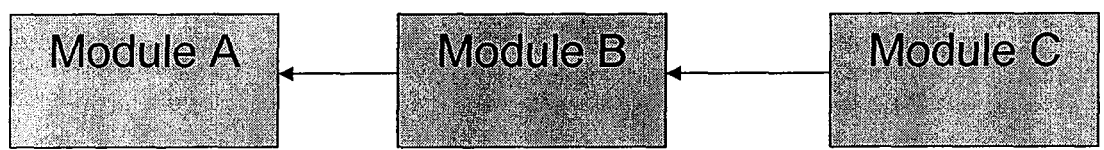
FIG. 7 illustrates an example of dependencies between modules, where there are no cyclic dependencies.
Figure 8:
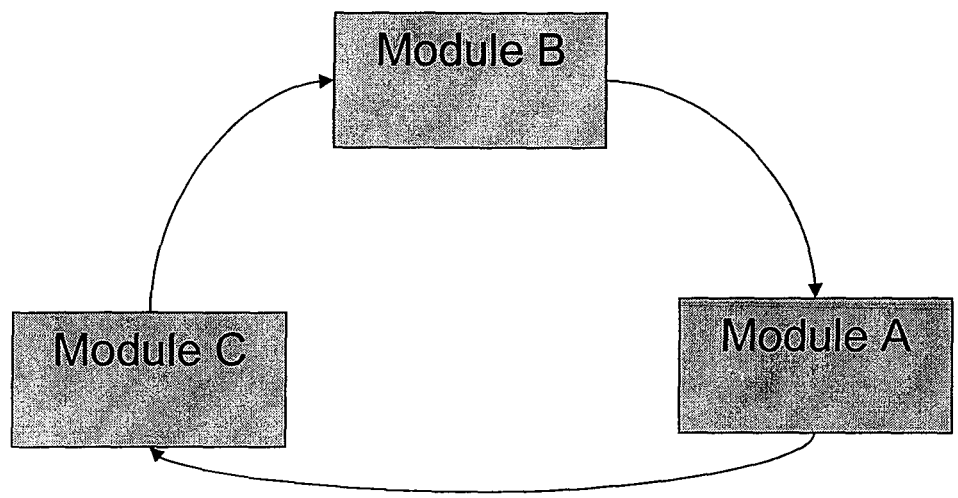
FIG. 8 illustrates an example of dependencies between modules, where there are cyclic dependencies.

In contrast to the less complex dependencies shown in the example of FIG. 7 and described above, many webpages can contain modules with complex dependencies that may cause cycles as well. This scenario is illustrated in FIG. 8. These more complex types of dependencies can lead to cycles, which can be difficult to resolve. For example:

Module C has the following properties defined:
  <Property id="3" name="Property3" type="Input"/>
  <Property id="1" name="Property1" type="Output"/>

Now, in this example, Module C depends on Module B for its input property. However, Module A depends on Module C and Module B depends on Module A. Thus, a cycle of dependencies has been created. This kind of dependency cycle can cause problems in the execution of an application or the rendering of a webpage with modules having a dependency cycle. It would be advantageous to break or resolve the dependency cycle and thereby improve the reliability of the application or the rendering of a webpage.

Approach 1 to Break the Dependency Cycle

Figure 9:
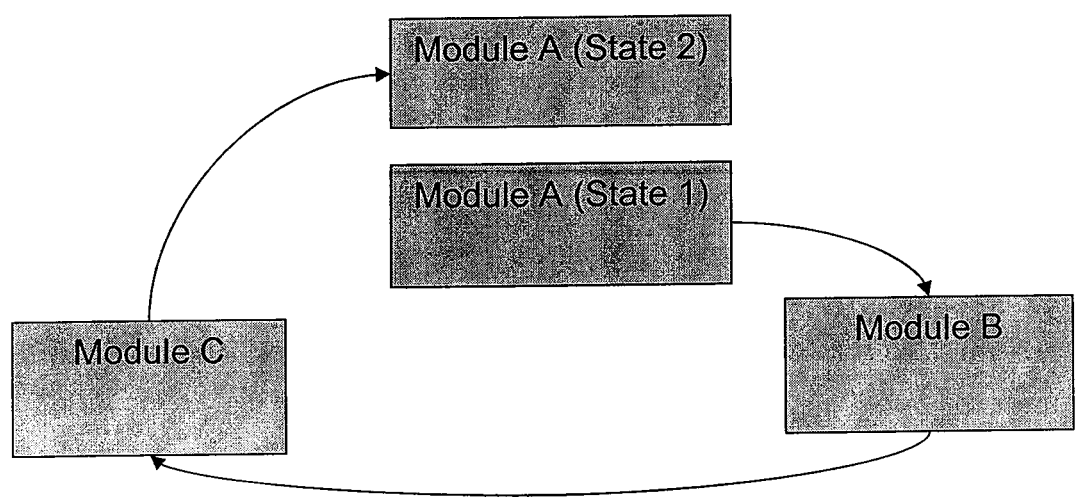
FIGS. 9 and 10 illustrate an example of a particular embodiment for breaking the module dependency cycle by implementing a module having two states.
Figure 10:
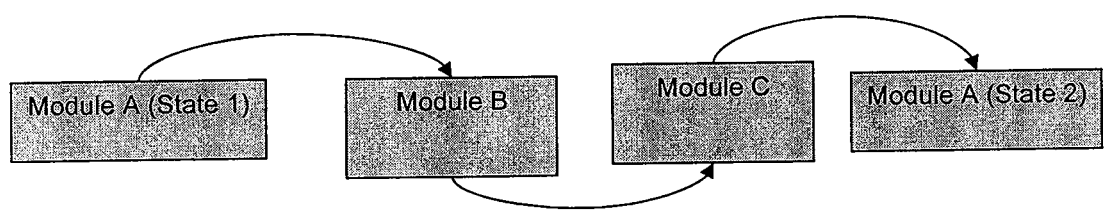

One of the (nodes) modules within the dependency cycle can be made a stateful module. The number of states is determined by the number of edges (in and out) that are available at that node (for that module) in the Directed Asynchronous Graph for the corresponding page. In the example shown in FIGS. 9 and 10, Module A can have two states. One state is used to capture the dependency to Module B and another state can be used to capture the dependency from Module C to Module A. Therefore, to address the cyclic dependency shown in the example of FIG. 8, the graph would change to look as illustrated in FIG. 9, or alternatively as illustrated in FIG. 10. This essentially breaks the cycle and gives us an acyclic graph.

Approach 2 to Break the Dependency Cycle

In a second example embodiment, the dependencies between modules can be discovered at design time. At runtime, any cycles in the dependencies are ignored and logged as errors to be fixed. Additionally, the modules can be coded as stateful modules as indicated above to break the dependency cycle.

Orchestrator

In a particular example embodiment, an orchestrator component is responsible for executing the modules of a page in the order of the dependencies indicated in the corresponding graph generated for the page. Given that what gets served to the user depends on many things including the segment, variants, testing, optimization, traffic driver rules etc., this framework attempts to execute and serve the finding pages dynamically based on factoring in a multitude of the aforementioned systems. This orchestration framework executes all the interdependent modules on the page dynamically leveraging an n-pass mechanism until the convergence for the entire page is achieved.

With the dynamic nature of a buyer experience, the execution path required to process various components of an application changes as well. This entails having a smart agent to orchestrate what needs to be executed and rendered for the buyer. This orchestration layer as described herein for an example embodiment attempts to achieve this. Finding pages are incredibly complex given that there are many modules on the page and many inter-dependencies among them. This is the case, mainly, to invoke efficient common queries across multiple functionalities on the page. This adds a lot more complexity from a dependency and execution perspective. The Orchestration layer as described herein generates the dependency graph for a webpage based on the metadata of the page and the various modules on the page. Then, the Orchestration layer uses an n-pass technique to invoke the modules repeatedly based on the dependency graph until the full convergent page is materialized.

Figure 5:
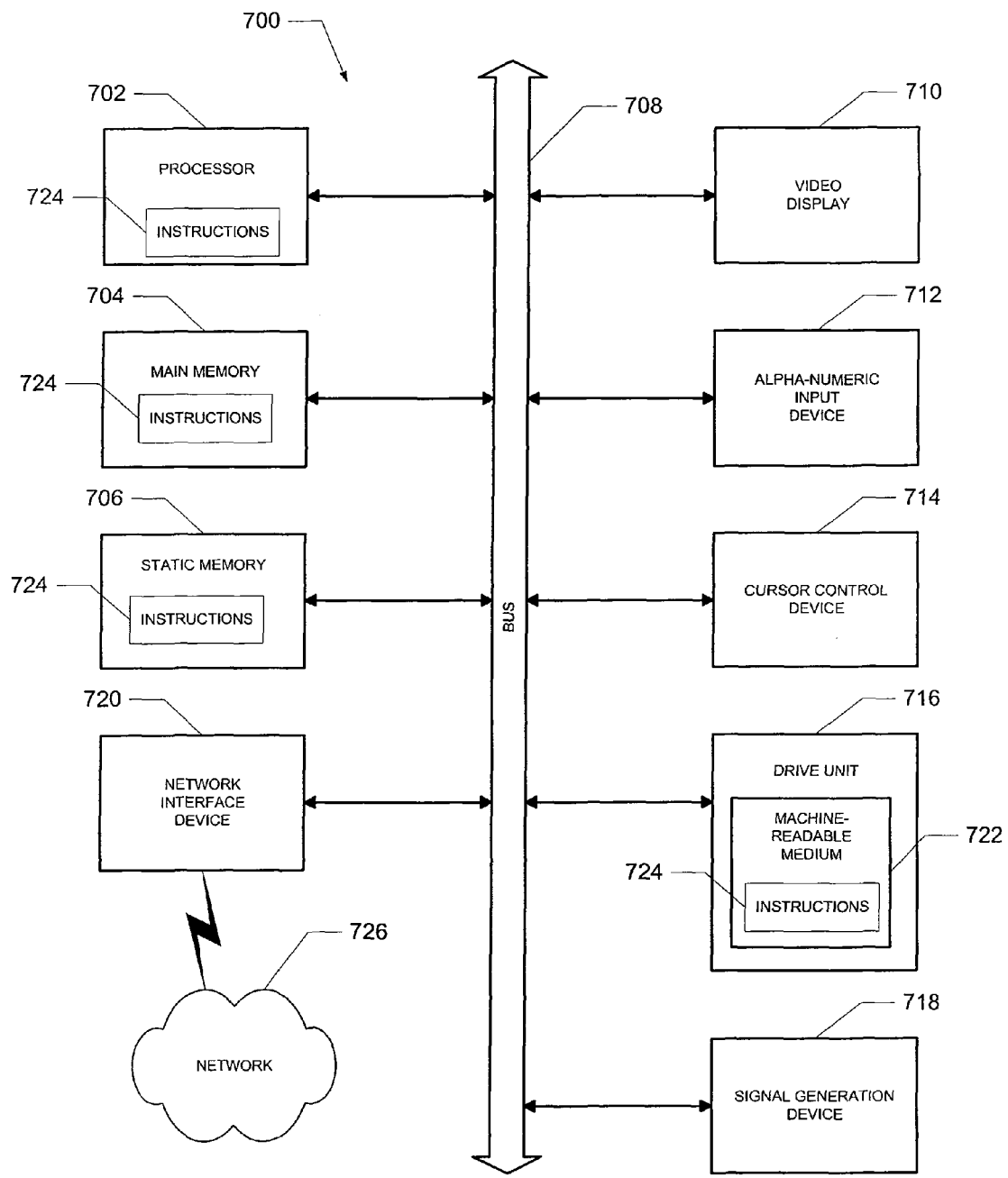
FIG. 5 shows a diagrammatic representation of a machine in the form of a computer system within which a set of instructions, for causing the machine to perform any one or more of the methodologies discussed herein, may be executed, according to an example embodiment.

FIG. 5 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, a module may represent a logical unit of code that can be reused on a web page or on multiple web pages. In still other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium.

The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a system and method for orchestration of customization for a user experience are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   with a processor, automatically producing user experience customization selections to generate a webpage based on context information and a collection of user activity feedback from a community of users who previously interacted with the webpage, the user experience customization selections including a plurality of modules for inclusion in the web page, each of the modules representing a user-interface element, and one or more of the plurality of modules having input and output properties defining at least one application programming interface (API);
   discovering dependencies between the one or more of the plurality of modules by extracting dependency information from the at least one API associated with the one or more of the plurality of modules;
   generating a dependency graph for the webpage based on the dependencies between the one or more of the plurality of modules; and
   invoking the plurality of modules based on the dependency graph to generate the webpage.

2. The method of claim 1, wherein at least one of the plurality of modules being a logical unit of code that can be reused on the webpage.

3. The method of claim 1, further comprising:
   designating at least one of the plurality of modules for retaining the dependency information, the dependency information including information indicative of states of dependencies between the one or more of the plurality of modules.

4. The method of claim 3, wherein the dependency state information for the plurality of modules of the webpage is based in part on metadata of the webpage.

5. The method of claim 1, further comprising:
adjusting the user experience customization selections based on the collection of user activity feedback from the community of users to provide selections likely favored by a user based on a correlation of the user activity feedback with the context information.

6. The method of claim 1, wherein the context information is selected from the group consisting of: site identifier, buyer segmentation information, domain identifier, and keywords/queries.

7. The method of claim 1, wherein the context information is selected from dimensions in the group consisting of: site identifier, buyer segmentation information, domain identifier, and keywords/queries, and the method further includes progressively falling back to other sufficient and accurate dimensions in the group based on a particular dimension not providing sufficient or accurate information.

8. The method of claim 1, wherein the user experience customization selections are selected from the group consisting of: page type, modules, and configurations.

9. The method of claim 1, wherein invoking the plurality of modules based on the dependency graph to generate the webpage further comprises:
executing the plurality of modules of the webpage in an order indicated by the dependency graph.

10. A system comprising:
a processor; and
an orchestrator, executable by the processor, the orchestrator configured to
automatically produce user experience customization selections to generate the webpage based on context information and a collection of user activity feedback from a community of users who previously interacted with the webpage, the user experience customization selections including the plurality of modules for inclusion in the web page, each of the modules representing a user-interface element, and one or more of the plurality of modules having input and output properties defining at least one application programming interface (API);
discover dependencies between the one or more of the plurality of modules by extracting dependency information from the at least one API associated with the one or more of the plurality of modules;
generate a dependency graph for the webpage based on the dependencies between the one or more of the plurality of modules; and
invoke the plurality of modules based on the dependency graph to generate the webpage.

11. The system of claim 10, wherein at least one of the plurality of modules being a logical unit of code that can be reused on the webpage.

12. The system of claim 10, wherein the orchestrator is further configured to:
designate at least one of the plurality of modules for retaining the dependency information, the dependency information including information indicative of states of dependencies between the one or more of the plurality of modules.

13. The system of claim 10, wherein the dependency state information for the plurality of modules of the webpage is based in part on metadata of the webpage.

14. The system of claim 10, wherein the orchestrator is further configured to:
adjust the user experience customization selections based on the collection of user activity feedback from the community of users to provide selections likely favored by a user based on a correlation of the user activity feedback with the context information.

15. The system of claim 10, wherein the context information is selected from the group consisting of: site identifier, buyer segmentation information, domain identifier, and keywords/queries.

16. The system of claim 10, wherein the context information is selected from dimensions in the group consisting of: site identifier, buyer segmentation information, domain identifier, and keywords/queries, and the method further includes progressively falling back to other sufficient and accurate dimensions in the group based on a particular dimension not providing sufficient or accurate information.

17. The system of claim 10, wherein the user experience customization selections are selected from the group consisting of: page type, modules, and configurations.

18. A non-transitory machine readable medium storing instructions that, when executed by at least one processor of a machine, cause the machine to perform operations comprising:
automatically producing user experience customization selections to generate a webpage based on context information and a collection of user activity feedback from a community of users who previously interacted with the webpage, the user experience customization selections including a plurality of modules for inclusion in the web page, each of the modules representing a user-interface element, and one or more of the plurality of modules having input and output properties defining at least one application programming interface (API);
discovering dependencies between the one or more of the plurality of modules by extracting dependency information from the at least one API associated with the one or more of the plurality of modules;
generating a dependency graph for the webpage based on the dependencies between the one or more of the plurality of modules; and
invoking the plurality of modules based on the dependency graph to generate the webpage.

19. The non-transitory machine readable medium of claim 18, wherein at least one of the plurality of modules being a logical unit of code that can be reused on the webpage.

20. The non-transitory machine readable medium of claim 18,
wherein the operations further comprising:
designating at least one of the plurality of modules for retaining the dependency information, the dependency information including information indicative of states of dependencies between the one or more of the plurality of modules.

* * * * *